United States Patent Office 3,809,693
Patented May 7, 1974

3,809,693
PROCESS FOR THE TRIMERIZATION OF NITRILES
Gordon H. Miller, Richmond, Va., assignor to
Texaco Inc., New York, N.Y.
No Drawing. Filed Sept. 1, 1971, Ser. No. 177,093
Int. Cl. C07d 55/50
U.S. Cl. 260—248 CS                                    6 Claims

ABSTRACT OF THE DISCLOSURE

Aromatic nitriles, such as terephthalonitrile, isophthalonitrile, benzonitrile, etc., are trimerized to the corresponding 1,3,5-triazine by heating the nitrile in the presence of a catalyst, such as a metal chloride, and afterward the unconverted nitrile is removed overhead from the triazine product by sublimation.

BACKGROUND OF THE INVENTION

Field of the invention

This invention relates to a process for preparing 1,3,5-triazines in high yield by trimerization of aromatic nitriles. More particularly, this invention relates to an improved process for the conversion of aromatic nitriles to the corresponding aromatic substituted 1,3,5-triazines in which the nitriles are heated with a catalyst at a temperature of about 200 to about 370° C. and afterward the unconverted monomer is removed from the triazine product by sublimation.

Description of the prior art

The preparation of 1,3,5-triazines from aromatic nitriles, such as benzonitrile, etc. has been described in the literature. Trimerization of aromatic nitriles, for example, can be carried out catalytically or by employing heat alone or heat and pressure. A wide variety of catalysts are known including hydrides and amides of the alkali metals and alkaline earth metals, sulfuric acid, zinc diethyl, bromine, metallic sodium, zinc chloride, aluminum chloride, titanium tetrachloride, antimony trichloride, nickel chloride, copper chloride, beryllium chloride, bismuth oxychloride, manganese chloride, cobalt chloride, manganese bromide, cobalt bromide, copper acetate, manganese acetate, vanadyl chloride, etc. A number of other catalysts are described by Toland in U.S. Pat. 3,060,-179, by Johns in U.S. Pat. 3,502,579 and by Karguin et al. in U.S. Pat. 3,164,555.

All of the processes of the prior art for the preparation of 1,3,5-triazines by trimerization of the corresponding aromatic nitriles suffer from a number of disadvantages. Most of the previously proposed processes are tedious to operate, a long reaction time is generally required and it has been found especially difficult to conveniently remove the unconverted nitrile from the 1,3,5-triazine product. Toland in U.S. Pat. 3,060,179 removes unreacted nitrile from the reaction mixture by solvent extraction and then, at very high temperatures (i.e., from 400 to 500° C.) and at a relatively slow rate sublimes the trimer overhead.

One of the primary objects of this invention is to provide a process for converting aromatic nitriles to 1,3,5-triazines whereby the trimer product can be conveniently recovered from the reaction mixture in a high yield.

Another object of this invention is to provide a process in which unconverted nitrile can be removed from the triazine product at a moderate temperature.

BRIEF DESCRIPTION OF THE INVENTION

This invention relates to a process for the preparation of 1,3,5-triazines by heating an aromatic nitrile in the presence of a catalyst and afterward removing unconverted nitrile overhead from the triazine product by sublimation.

DETAILED DESCRIPTION OF THE INVENTION

The process of this invention is applicable to the conversion of a wide variety of aromatic nitriles, including mononitriles, dinitriles and other polynitriles, to form aromatic substituted 1,3,5-triazines.

Nitriles useful as starting materials in the process of this invention include, for example, compounds of the formula:

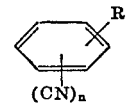

(I)

wherein R is selected from the group consisting of hydrogen, alkyl of from 1 to 10 inclusive carbon atoms as exemplified by methyl, ethyl, propyl, pentyl, heptyl, octyl and isomers thereof, amino, nitro, hydroxyl, carboxyl and halogen selected from the group consisting of chlorine, fluorine, iodine and bromine, and $n$ is an integer of from 1 to 4 inclusive.

Among the nitriles which are suitable as starting materials in the method of this invention are benzonitrile,
2-toluonitrile,
3-toluonitrile,
4-toluonitrile,
3-ethylbenzonitrile,
4-t-butylbenzonitrile,
4-aminobenzonitrile,
3-aminobenzonitrile,
3-hydroxybenzonitrile,
3-nitrobenzonitrile,
4-ethyl-2-nitrobenzonitrile,
2-hydroxy-3-propylbenzonitrile,
3-phenylbenzonitrile,
2,4-dimethylbenzonitrile,
2,6-diethylbenzonitrile,
3-chlorobenzonitrile,
4-bromobenzonitrile,
3-fluorobenzonitrile,
1-naphthonitrile,
2-naphthonitrile,
3-naphthonitrile,
3-methyl-1-naphthonitrile,
3-chloro-1-naphthonitrile,
4-nitro-1-naphthonitrile,
2-hydroxy-1-naphthonitrile,
4-hydroxy-2-methyl-1-naphthonitrile,
4-fluoro-2-naphthonitrile,
orthophthalonitrile,
isophthalonitrile,
terephthalonitrile,
3-methyl-1,4-dicyanobenzene,
5-isopropyl-1,3-dicyanobenzene,
2,5-dimethyl-1,4-dicyanobenzene,
2-chloro-1,3-dicyanobenzene,
5-bromo-1,4-dicyanobenzene,
5-amino-1,3-dicyanobenzene,
3-nitro-1,2-dicyanobenzene,
4-hydroxy-1,3-dicyanobenzene,
2-(dichloromethyl)-1,3-dicyanobenzene,
5-(chloromethyl)-1,4-dicyanobenzene,
2-ethyl-3-chloro-1,4-dicyanobenzene,
3-nitro-1,2-dicyanobenzene,
1,3,5-tricyanobenzene,
2-chloro-1,3,5-tricyanobenzene,
3-fluoro-1,4,5-tricyanobenzene, 6-nitro-1,3,5-tricyanobenzene,
2-hydroxy-3,4,5-tricyanobenzene,
4-methyl-1,3,5-tricyanobenzene,
1,2,4,5-tetracyanobenzene,
3-hydroxy-1,2,4,5-tetracyanobenzene,
2-bromo-1,3,4,5-tetracyanobenzene,
3-nitro-1,2,4,5-tetracyanobenzene,
2-isopropyl-1,3,4,5-tetracyanobenzene and
3-n-pentyl-1,2,4,5-tetracyanobenzene.

Mixtures of the above-mentioned aromatic nitriles, such as a mixture of about 66 percent by weight of isophthalonitrile and about 34 percent by weight of terephthalonitrile can be employed in this process, if desired.

An especially suitable group of starting materials include nitriles of the Formula I above where $n$ is an integer of from 1 to 2 inclusive. Examples of materials in this last-mentioned category include isophthalonitrile (i.e., 1,3-dicyanobenzene) and terephthalonitrile (i.e., 1,4-dicyanobenzene). In addition to the examples shown above, other substituted nitriles can be employed, for example, those containing groups derived from a carboxyl group, such as carboxylic salts, amides and esters as well as sulfone and sulfonic acid groups. In this specification the term nitrile is used to refer to compounds having one or more cyano groups attached to the carbon atoms of the aromatic ring.

In this process the temperature at which the trimerization reaction is conducted can be varied over a wide range. Generally, the temperature employed will be from about 200 to about 370 and, preferably, from about 220 to about 320° C. The reaction time will vary widely depending upon the nature of specific nitrile used and the reaction conditions employed, although a satisfactory yield of the product can be achieved in about 0.1 to 20 hours or more. Preferably, the reaction mixture is agitated either by a mechanical stirrer or agitator, a platform rocker or by blowing an inert gas through the reaction mass.

Although only a catalytic amount of the particular catalyst utilized is required in this process, generally the quantity of the catalyst employed will be from about 0.1 percent by weight up to about 50 percent by weight based on the weight of the nitrile charged to the reactor and preferably will be from about 0.1 percent by weight up to about 20 percent by weight on the same basis. Preferably, the reaction is carried out in the absence of air or in the presence of an inert gas which can be, for example, nitrogen, argon, helium, etc. Mixtures of these same inert gases may be employed, if desired. The process of this invention can be conducted under a pressure less than atmospheric or pressures of about atmospheric to about 2000 p.s.i. may be utilized. Preferably, the pressure will be from about atmospheric to about 500 p.s.i.

A wide variety of catalysts may be utilized in conducting the process of this invention. Useful catalysts include:

(A) Compounds of non-metals, such as phosphorus pentoxide; non-metal halides, such as phorphorus trichloride, phosphorus tribromide, phosphorus triiodide, phosphorus pentachloride, phosphorus pentabromide, arsenic tribromide, arsenic triiodide and arsenic trichloride;

(B) Acids such as sulfuric acid, hydrochloric acid, hydrofluoric acid, fluosulfonic acid, chlorosulfonic acid, etc.; and (C) Halides of metals of Groups II, III, IV, V and VIII of the Periodic Table as set forth on page 125 of Mellor's Modern Inorganic Chemistry, Revised Edition, Longmans, Green and Co., Ltd. (1967), such as zinc chloride, aluminum chloride, aluminum iodide, aluminum bromide, ferric chloride, titanium tetrachloride, antimony trichloride, antimony trifluoride, antimony triiodide, boron trichloride, boron trifluoride, cuprous chloride, cobalt bromide, vanadium tetrafluoride, manganous bromide, manganic chloride, strontium fluoride, strontium chloride, zirconium tetraiodide, zirconium tetrachloride, stannous chloride and stannic iodide.

A highly important facet of this invention is that after the conversion operation has been completed the unreacted nitrile is removed overhead from the reaction mixture by sublimation, leaving as bottoms the trimer which is available for further polymerization to a B-stage (partially cured) polymer and to the fully cured polymeric product. This sublimation scheme can be applied to purification of the trimer product whether the reaction is carried out at atmospheric or at higher pressures.

It is economically advantageous to conduct the reaction under pressure, so that when the trimer conversion is optimum the temperature can be maintained while the pressure is reduced to atmospheric or to a partial vacuum. If desired, an inert gas can be employed in the sublimation operation and in this case the inert gas or mixture of inert gases is blown through the heated reaction mixture to sublime out all of the unconverted monomer. If a volatile catalyst, such as ferric chloride, titanium tetrachloride, aluminum chloride, antimony trichloride, antimony pentachloride, arsenic trichloride, arsenic pentachloride, boron trichloride, phosphorus trichloride, phosphorus pentachloride, stannic chloride, vanadium tetrachloride, or zirconium tetrachloride, is employed it will also be removed from the reaction mixture along with the unreacted nitrile during the sublimation step, and the recovered mixture of the catalyst and the unreacted monomer can, after refortification, by recycled for further trimerization.

If a non-volatile catalyst is employed in this process, such as zinc chloride, phosphorus pentoxide or strontium dichloride, the catalyst will remain in the trimer product at the conclusion of the sublimation operation and in the case of an aromatic substituted 1,3,5-triazine formed from a dinitrile, the trimer product together with the included catalyst may then be employed to prepare a B-stage polymer, following which the product may be cured to a final state. The non-volatile catalyst as well as the volatile catalysts may be removed from the trimer before or after sublimation by a solvent wash with materials such as acetone, methyl alcohol, ethyl alcohol, acetonitrile, ethyl ether, etc. In special cases, such as in the removal of zinc chloride, phosphorus pentoxide and strontium dichloride, extraction with water will suffice.

The triazine products of this invention prepared from dinitriles can, as previously pointed out, be further polymerized in the presence of suitable catalysts such as titanium tetrachloride, zinc chloride, boron trichloride, etc. at temperatures of about 450° to about 500° C. or more to form B-stage or partially polymerized polymers which in a final operation can be molded and completely cured at about 2000 p.s.i. for 4 hours at 450° C., for example, to form thermoset, high temperature resistant polymeric products useful for a wide variety of applications such as in the preparation of high temperature resistant materials, etc., as more completely described in Miller application entitled Polymerization of Aromatic Nitriles (Ser. No. 177,169), filed even date herewith, now U.S. Pat. No. 3,775,380, which is incorporated herein by its entirety. The completely cured products can be machined to produce a wide variety of parts such as housings, liners and impellars for pumps useful for handling a number of organic liquids, such as alcohols, ketones, ethers, amines, etc. When compounded with glass fibers, asbestos, etc., the B-stage resins can be employed in preparing solvent resistant pipe suitable for carrying methyl alcohol, ethyl alcohol, acetone and corrosive gases, such as chlorine, etc. The 1,3,5-triazine products of this invention can also be employed in preparing heat resistant semiconductor materials as more fully described in Karguin et al., U.S. Pat. 3,164,555.

Typical of the 1,3,5-triazine products formed by the process of this invention is 2,4,6-tris(3-cyanophenyl)-

1,3,5-triazine(II) prepared from isophthalonitrile. The formula of (II) is as follows:

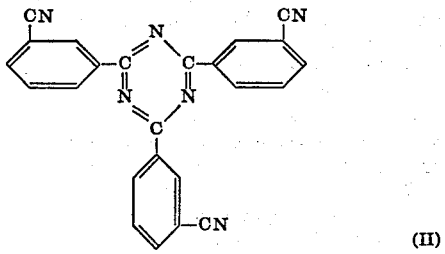

(II)

The products of this invention are insoluble in most organic solvents; however, they exhibit limited solubility in hot xylene, acetonitrile and acetone, etc.

The following examples illustrate various embodiments of this invention and are to be considered not limitative.

EXAMPLE 1

A total of 150 g. of 1,3-dicyanobenzene and 1.5 g. of zinc chloride were placed in a rocking autoclave and the system was closed. Heating was commenced and the autoclave temperature was brought up to 275° C. over a 40 minute period after which it was maintained at that temperature for 4 hours 10 minutes. The autoclave chamber was removed from the heater and quenched with cold water following which the chamber was opened. The resulting solid product was removed and then ground for about 4 hours in a ball mill. Infrared analysis of the crude product indicated the presence of the trimer, i.e., 2,4,6-tris(3-cyanophenyl)-1,3,5-triazine and unreacted 1,3-dicyanobenzene.

The crude product was submitted for elemental analysis and the following results were obtained:

Theoretical ($C_8H_4N_2$) (percent): C, 74.98; H, 3.15; N, 21.87. Found (percent): C, 72.9; H, 3.8; N, 23.3.

A portion of the crude product was purified by sublimation. Crude product in the amount of 3.8439 g. was placed in a distilling flask equipped with a magnetic stirrer and fitted with a heated transfer line leading to a collecting flask which in turn was connected through an air condenser and drying tube to a vacuum pump. The distilling flask containing the crude product was placed in a silicone bath heated by a hot plate and at a bath temperature of 180° C., sublimation was observed. At 190° C. (bath temperature) the crude product in the flask had melted and a quantity of sublimate had collected in the collecting flask. At a bath temperature of 205° C. the trimer was no longer molten and at 250° C. it appeared that very little additional sublimate was being collected. Finally, the bath temperature was raised to 298° C. without any further changes being observed.

A material balance for this example is set forth below:

|  | Weight | |
|---|---|---|
|  | Grams | Percent |
| Charge: |  |  |
| Mixed trimer and monomer | 3.8439 | 100 |
| Sublimate (1,3-dicyanobenzene) | 2.3563 | 61.3 |
| Residue—triazine trimer (2,4,6-tris(3-cyanophenyl)-1,3,5-triazine) | 1.4534 | 37.8 |
|  | 3.8097 | 99.1 |
| Loss | 0.0342 | 0.9 |
|  | 3.8439 | 100.0 |

By infrared analyses it was determined that the sublimate was pure 1,3-dicyanobenzene and that the residue was pure 2,4,6-tris(3-cyanophenyl)-1,3,5-triazine.

EXAMPLE 2

To a three-necked flask fitted with an air condenser having an attached drying tube, a themrometer, magnetic stirring bar, heating mantle and an inlet for nitrogen purge gas, there was added 60.0995 g. of 1,4-dicyanobenzene and 0.6595 g. of zinc chloride. The flask with charge was placed on a magnetic stirring plate and then purged with a nitrogen stream. Stirring was started and the mixture heated to a temperature of 270° C. and maintained at that temperature for five hours. After the flask had cooled the solidified material (58.7680 g.) was broken into lumps and placed in a large beaker. A portion of this crude product was washed with water to remove zinc chloride catalyst. Analysis of the water-washed material by infrared indicated that the product contained about 34 weight percent of unreacted 1,4-dicyanobenzene and 66 weight percent of 2,4,6-tris(4-cyanophenyl)-1,3,5-triazine.

A portion of the crude product (i.e., the impure trimer) obtained above wasp urified by sublimation using the same method employed in Example I. Pertinent details relating to the sublimation step are set out below:

|  | Weight | |
|---|---|---|
|  | Grams | Percent |
| Material changed (impure trimer) | 6.7635 | 100 |
| Material sublimed overhead (1,4-dicyanobenzene) | 2.3909 | 35.35 |
| Material remaining (2,4,6-tris(4-cyanophenyl)-1,3,5-triazine) | 4.3426 | 64.21 |
| Recovery | 6.7335 | 99.56 |
| Loss | 0.0330 | 0.44 |
|  | 6.7635 | 100.00 |

It was determined by infrared analyses that the sublimate was pure 1,4-dicyanobenzene and that the material remaining was 2,4,6-tris(4-cyanophenyl)-1,3,5-triazine.

EXAMPLES III–VI

A series of examples was carried out in which 1,3-dicanobenzene was trimerized in the presence of phosphorus pentachloride as a catalyst. 1,3-dicyanobenzene and the phosphorus pentachloride were charged to stainless steel reactor tubes (⅜ inch O.D. by 4½ inches in length). The sealed tubes were immersed in a heating bath of silicone oil maintained at 250° C. for 8¾ hours. The tubes were removed from the heating bath, allowed to cool and the hard reaction mixture which had formed was removed with the aid of a hand drill. The reaction mixture was washed with methanol and water to remove the catalyst, then with benzene and finally with 2,2-dimethylbutane followed by air drying. The final product was analyzed by infrared. Pertinent details relating to these examples are set out in Table I.

The crude product recovered in Examples III–VI can be subjected to sublimation under vacuum to remove unreacted 1,3-dicyanobenzene in the same manner as described in Example I.

TABLE 1

|  | Example number | | | |
|---|---|---|---|---|
|  | III | IV | V | VI |
| Charge: |  |  |  |  |
| 1,3-dicyanobenzene (g.) | 1.9866 | 2.0025 | 1.9999 | 1.9919 |
| Phosphorus pentachloride (g.) | 0.0753 | 0.1722 | 0.4150 | 0.5020 |
| Weight percent of catalyst | 3.77 | 7.92 | 17.18 | 20.13 |
| Product Recovered (g.) | 1.0760 | 1.6762 | 1.7195 | 2.0804 |
| Weight percent trimer a | 65 | 52 | 57 | 45 |
| Yield (percent based on weight of 1,3-dicyanobenzene charged) | 35.2 | 43.5 | 49.0 | 47.0 | a Identified by infrared analysis as 2,4,6-tris(3-cyanophenyl)-1,3,5-triazine.

EXAMPLE VII 1,3-dicyanobenzene (2.0023 g.) and phosphorus pentoxide (0.1265 g.) were charged to a stainless steel reactor tube (⅜ inch O.D. by 4½ inch length) in a dry box. The tube was sealed, immersed in a heating bath, heated for 5 hours at 250° C. and then removed from the bath and permitted to cool. The reaction mixture removed from the tube was washed with methanol, water and finally with 2,2-dimethylbutane, following which it was dried in a slow stream of nitrogen. Details relating to this example are set out below.

Charge:
    1,3-dicyanobenzene (g.) _____ 2.0023
    Phosphorus pentoxide (g.) _____ 0.1265
    Weight percent catalyst _____ 5.94
Weight of product (g.) _____ 2.1910
Weight percent of trimer in product a _____ 52
Yield of product (percent based on weight of
    1,3-dicyanobenzene charged) _____ 56.9 a Determined by infrared analysis to be 2,4,6-tris(3-cyanophenyl)-1,3,5-triazine.

What is claimed is:

1. A process for preparing an aromatic substituted 1,3,5-triazine which comprises:
    (A) heating an aromatic nitrile at a temperature of from about 200 to about 370° C. in the presence of a catalyst selected from the group consisting of: phosphorus pentoxide, phosphorus pentachloride, arsenic trichloride and arsenic pentachloride; and
    (B) removing the unconverted nitrile from the triazine product by sublimination.

2. The method of claim 1 wherein the said aromatic nitrile has the formula:

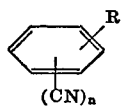

wherein R is selected from the group consisting of hydrogen, alkyl of from 1 to 10 inclusive carbon atoms, amino, nitro, hydroxyl, carboxyl, and halogen, and $n$ is an integer of from 1 to 2 inclusive.

3. The process of claim 1 wherein the said nitrile is terephthalonitrile.

4. The process of claim 1 wherein the said nitrile is a mixture of about 66 weight percent of isophthalonitrile and about 34 weight percent of terephthalonitrile.

5. The process of claim 1 wherein from about 0.1 to about 50 weight percent of the said catalyst is employed based on the weight of the nitrile.

6. The process for the preparation of 2,4,6-tris(4-cyanophenyl), 1,3,5-triazine which comprises heating terephthalonitrile in the presence of phosphorus pentachloride at a temperature of from about 200 to 370° C. and removing the unconverted terephthalonitrile from the triazine product by sublimation.

References Cited
UNITED STATES PATENTS
| | | | |
|---|---|---|---|
| 2,762,797 | 9/1956 | Hechenbleikner | 260—248 |
| 2,858,310 | 10/1958 | Grundmann et al. | 260—258 X |
| 3,060,179 | 10/1962 | Toland | 260—248 |
| 3,609,128 | 9/1971 | Johns | 260—78.4 |

FOREIGN PATENTS
| | | | |
|---|---|---|---|
| 653,468 | 5/1951 | Great Britain | 260—78.4 |

JOHN M. FORD, Primary Examiner